United States Patent
Wu et al.

(10) Patent No.: US 11,682,254 B2
(45) Date of Patent: Jun. 20, 2023

(54) SYSTEMS AND METHODS FOR MANAGING A FLOATING POPULATION

(71) Applicant: ZHEJIANG DAHUA TECHNOLOGY CO., LTD., Zhejiang (CN)

(72) Inventors: Yiping Wu, Hangzhou (CN); Xin Zeng, Hangzhou (CN); Huaishui Zhu, Hangzhou (CN); Yunbin Wu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/348,751

(22) Filed: Jun. 15, 2021

(65) Prior Publication Data

US 2021/0312740 A1    Oct. 7, 2021

Related U.S. Application Data

(63) Continuation of application No. PCT/CN2018/124612, filed on Dec. 28, 2018.

(51) Int. Cl.
 *G07C 9/27* (2020.01)
 *G07C 9/25* (2020.01)

(52) U.S. Cl.
 CPC .............. *G07C 9/27* (2020.01); *G07C 9/257* (2020.01); *G07C 2209/02* (2013.01)

(58) Field of Classification Search
 CPC .. G07C 9/27; G07C 2209/02; G07C 9/00571; G07C 9/00944; H04L 63/101; H04W 12/06; G06F 21/44
 See application file for complete search history.

(56) References Cited

U.S. PATENT DOCUMENTS

| | | | |
|---|---|---|---|
| 2014/0337930 A1* | 11/2014 | Hoyos | H04L 63/10 726/4 |
| 2018/0099641 A1 | 4/2018 | Wiechers et al. | |
| 2018/0373919 A1* | 12/2018 | Wong | G06V 40/1365 |

FOREIGN PATENT DOCUMENTS

| | | |
|---|---|---|
| CN | 103473844 A | 12/2013 |
| CN | 105096424 A | 11/2015 |

(Continued)

OTHER PUBLICATIONS

International Search Report in PCT/CN2018/124612 dated Jul. 12, 2019, 4 pages.

(Continued)

*Primary Examiner* — Vernal U Brown
(74) *Attorney, Agent, or Firm* — Metis IP LLC

(57) ABSTRACT

Systems and methods for managing a floating population can be used to obtain a register of a user from a user terminal via at least one terminal interface; receive a fingerprint input instruction from an administrator terminal via the at least one terminal interface; send the fingerprint input instruction to a fingerprint lock via the at least one network interface; obtain at least one fingerprint of the user from the fingerprint lock via the at least one network interface; send a notification to the administrator terminal via the at least one terminal interface after obtaining the at least one fingerprint of the user; and obtain a permission from the administrator terminal via the at least one terminal interface to permit the user associated with the user terminal to open the fingerprint lock using one of the at least one fingerprint.

20 Claims, 10 Drawing Sheets

(56) References Cited

FOREIGN PATENT DOCUMENTS

| CN | 105225039 | A | 1/2016 |
|---|---|---|---|
| CN | 105488634 | A | 4/2016 |
| CN | 106056518 | A | 10/2016 |
| CN | 106228650 | A | 12/2016 |
| CN | 106570955 | A | 4/2017 |
| CN | 106886970 | A | 6/2017 |
| CN | 107274278 | A | 10/2017 |
| CN | 107464320 | A | 12/2017 |
| CN | 107734158 | A | 2/2018 |
| CN | 108052925 | A | 5/2018 |
| CN | 108062809 | A | 5/2018 |
| CN | 108171842 | A | 6/2018 |
| CN | 108198292 | A | 6/2018 |
| CN | 108389289 | A | 8/2018 |
| CN | 108573556 | A | 9/2018 |
| CN | 108932782 | A | 12/2018 |
| WO | 2018095436 | A1 | 5/2018 |

OTHER PUBLICATIONS

Written Opinion in PCT/CN2018/124612 dated Jul. 12, 2019, 5 pages.
The Extended European Search Report in European Application No. 18945173.5 dated Oct. 15, 2021, 11 pages.
"Keyless Entry Digital Door Lock", Web page <https://web.archive.org/web/20181129152757/http: //www.milocks.com/Lora/ >, Oct. 7, 2021.
First Office Action in Chinese Application No. 201880100469.9 dated Jul. 12, 2022, 32 pages.
John Viega, The Myths of Security (Chinese Version), Southeast University Press, 2013, 8 pages.
Zhang, Qijin, Internet of Things: Leading China and the World, China Commercial Publishing House, 2017, 6 pages.
Yu, Yijia, Application of Smart Security Access Cards in the Making of Safe Communities, Development & Innovation of Machinery & Electrical Products, 30(6): 33-35, 2017.

* cited by examiner

900

Receiving a fingerprint freezing instruction or a finger deletion instruction for freezing or deleting at least one fingerprint of a user from an administrator terminal via at least one terminal interface ~ 910

Sending the fingerprint freezing instruction or the deletion instruction to a fingerprint lock via at least one network interface ~ 920

Obtaining a notification showing the fingerprint lock has frozen or deleted the at least one fingerprint of the user from the fingerprint lock via the at least one network interface ~ 930

FIG. 9

SYSTEMS AND METHODS FOR MANAGING A FLOATING POPULATION

CROSS-REFERENCE TO RELATED APPLICATIONS

This application is a Continuation of International Application No. PCT/CN2018/124612, filed on Dec. 28, 2018, the entire contents of which are hereby incorporated by reference.

TECHNICAL FIELD

The present disclosure generally relates to systems and methods for information management, and more particularly, to systems and methods for managing a floating population.

BACKGROUND

With the rapid development of cities (especially first-tier cities), a large floating population swarms into the cities and the number of rental houses (e.g., rental apartments, hotels) increases sharply, creating a great difficult management by the government (e.g., a public security system) or administrators of the rental houses. A poor management of the large floating population may result in great social safety risks. In some occasions, the management of floating population depends on collecting information of the floating population the floating population initiatively registering at the public security system, or the police conducting door-to-door registration and then entering the registration into the public security system. In some other occasions, the administrators install smart locks (that can open doors with passwords, cards or Wechat™) in the rental houses to improve the management of the floating population, which, however, cannot provide an identification of the floating population or a linkage with the public security system. Thus, it is desirable to provide systems and methods for managing the floating population to help the public security system and/or the administrators of the rental houses to manage the floating population more efficiency, and to help the floating population to register more conveniently.

SUMMARY

An aspect of the present disclosure introduces a system for managing a floating population. The system may include at least one storage medium including a set of instructions for managing the floating population. The system may also include at least one terminal interface to communicate with at least one user terminal and at least one administrator terminal. The system may also include at least one network interface to connect with a LoRa base station. The LoRa base station may communicate with a plurality of fingerprint locks. The system may also include at least one processor in communication with the at least one terminal interface, the at least one network interface, and the at least one storage medium. When executing the set of instructions, the at least one processor may be directed to perform the following operations. The at least one processor may obtain a register of a user from a user terminal of the at least one user terminal via the at least one terminal interface. The at least one processor may also receive a fingerprint input instruction from an administrator terminal of the at least one administrator terminal via the at least one terminal interface. The at least one processor may also send the fingerprint input instruction to a fingerprint lock of the plurality of fingerprint locks via the at least one network interface. The at least one processor may also obtain at least one fingerprint of the user from the fingerprint lock via the at least one network interface. The at least one processor may also send a notification to the administrator terminal via the at least one terminal interface after obtaining the at least one fingerprint of the user. The at least one processor may also obtain a permission from the administrator terminal via the at least one terminal interface, the permission permitting the user associated with the user terminal to open the fingerprint lock using one of the at least one fingerprint.

In some embodiments, to obtain the register, the at least one processor may further obtain an identification photo of the user from the user terminal via the at least one terminal interface. The at least one processor may further obtain a facial photo of the user from the user terminal via the at least one terminal interface. The at least one processor may further determine whether the identification photo is consistent with the user utilizing a facial recognition technology.

In some embodiments, the at least one processor may further create a profile for the user associated with the user terminal based on the register.

In some embodiments, the system may further include at least one platform interface to communicate with a police platform. To create the profile, the at least one processor may further access a database stored in the police platform via the at least one platform interface. The at least one processor may further determine whether the user is a suspect based on the facial photo and the database. The at least one processor may further determine an ID tag of the user based on the determining whether the user is a suspect.

In some embodiments, the at least one processor may further obtain a plurality of fingerprint records of the user. The at least one processor may further determine whether there is an abnormality based on the plurality of fingerprint records and the ID tag of the user. In response to a determination that there is an abnormality, the at least one processor may further send an alert showing the abnormality to the police platform via the at least one platform interface.

In some embodiments, the at least one processor may further determine whether the user has been absent for a predetermined time period based on the plurality of fingerprint records. In response to a determination that the user has been absent for the predetermined time period, the at least one processor may further send an alert, showing the user has left, to the administrator terminal via the at least one terminal interface.

In some embodiments, the at least one processor may further obtain a plurality of ID tags of a plurality of candidate users. The at least one processor may further determine whether there is a suspect among the plurality of candidate users based on the plurality of ID tags. The at least one processor may further send, in response to a determination that there is a suspect, a suspect alert to the police platform via the at least one platform interface.

In some embodiments, the at least one processor may further determine a validity of a resident permit of the user based on the profile of the user and the database stored in the police platform. In response to a determination that the resident permit is due or overdue, the at least one processor may further send a due-or-overdue alert to the administrator terminal via the at least one terminal interface.

In some embodiments, the at least one processor may further receive a fingerprint freezing instruction or a finger deletion instruction for freezing or deleting the at least one fingerprint of the user from the administrator terminal via the at least one terminal interface. The at least one processor may further send the fingerprint freezing instruction or the deletion instruction to the fingerprint lock via the at least one network interface. The at least one processor may further obtain a notification showing the fingerprint lock has frozen or deleted the at least one fingerprint of the user from the fingerprint lock via the at least one network interface.

In some embodiments, the at least one processor may further receive a temporary key request for opening the fingerprint lock from the administrator terminal via the at least one terminal interface, the temporary key being associated with the user of the user terminal. The at least one processor may further generate and send a random key based on the temporary key request to the user terminal via the at least one terminal interface. The at least one processor may further obtain the random key from the user terminal via the at least one terminal interface. The at least one processor may further determine a validity of the random key.

According to another aspect of the present disclosure, a method for managing a floating population is provided. The method may include obtaining a register of a user from a user terminal via at least one terminal interface. The method may also include receiving a fingerprint input instruction from an administrator terminal via the at least one terminal interface. The method may also include sending the fingerprint input instruction to a fingerprint lock via at least one network interface. The fingerprint lock may communicate with a LoRa base station. The method may also include obtaining at least one fingerprint of the user from the fingerprint lock via the at least one network interface. The method may also include sending, after obtaining the at least one fingerprint of the user, a notification to the administrator terminal via the at least one terminal interface. The method may also include obtaining a permission from the administrator terminal via the at least one terminal interface. The permission may permit the user associated with the user terminal to open the fingerprint lock using one of the at least one fingerprint.

According to still another aspect of the present disclosure, a non-transitory computer readable medium, comprising at least one set of instructions compatible for managing a floating population, is provided. When executed by at least one processor of an electrical device, the at least one set of instructions may direct the at least one processor to perform the following operations. The at least one processor may obtain a register of a user from a user terminal via at least one terminal interface. The at least one processor may also receive a fingerprint input instruction from an administrator terminal via the at least one terminal interface. The at least one processor may also send the fingerprint input instruction to a fingerprint lock via at least one network interface. The fingerprint lock may communicate with a LoRa base station. The at least one processor may also obtain at least one fingerprint of the user from the fingerprint lock via the at least one network interface. The at least one processor may also send a notification to the administrator terminal via the at least one terminal interface after obtaining the at least one fingerprint of the user. The at least one processor may also obtain a permission from the administrator terminal via the at least one terminal interface, the permission permitting the user associated with the user terminal to open the fingerprint lock using one of the at least one fingerprint.

According to still another aspect of the present disclosure, a system for managing a floating population is provided. The system may include a register module, and an interface module. The register module may be configured to receive a fingerprint input instruction from an administrator terminal via at least one terminal interface. The interface module may be configured to receive a fingerprint input instruction from an administrator terminal via at least one terminal interface. The interface module may also be configured to send the fingerprint input instruction to a fingerprint lock via at least one network interface. The fingerprint lock communicates with a LoRa base station. The interface module may also be configured to obtain at least one fingerprint of the user from the fingerprint lock via the at least one network interface. The interface module may also be configured to send a notification to the administrator terminal via the at least one terminal interface after obtaining the at least one fingerprint of the user. The interface module may also be configured to obtain a permission from the administrator terminal via the at least one terminal interface. The permission may permit the user associated with the user terminal to open the fingerprint lock using one of the at least one fingerprint.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 is a flowchart illustrating an exemplary process for freezing or deleting at least one fingerprint of a user from a fingerprint lock according to some embodiments of the present disclosure.

DETAILED DESCRIPTION

Figure 1:
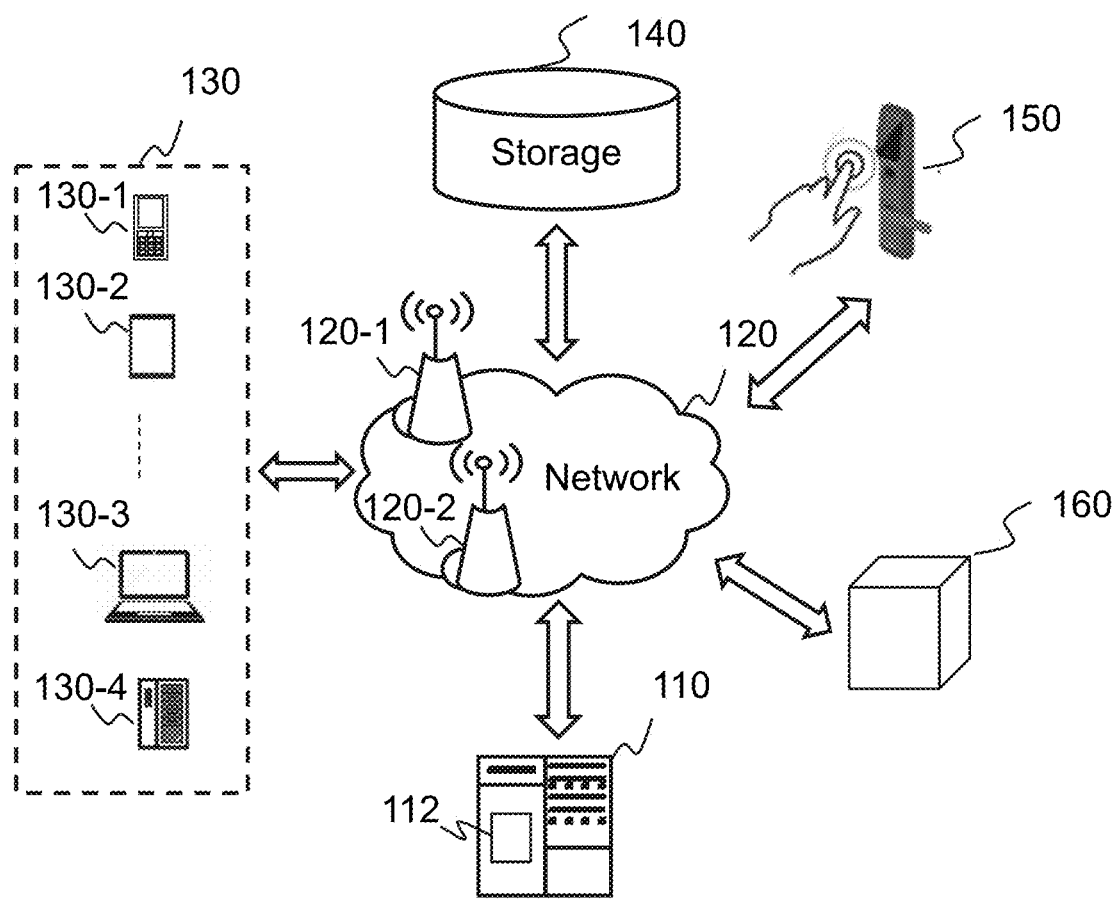
FIG. 1 is a schematic diagram illustrating an exemplary system for managing a floating population according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawing(s), all of which form part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for managing a floating population. To this end, the systems and methods may install fingerprint locks in rental houses (e.g., rental apartments, hotels). The fingerprint locks may transmit information from/to the system or any other platform (e.g., a police platform) based on a long range radio (LoRa) technology. A floating population may access the rental houses using his/her fingerprint. When the fingerprint is damaged, the floating population may apply for a temporary key from an administrator. The systems and methods may also manage the floating population by receiving registration, identification, and facial photos of the floating population. The systems and methods may verify the floating population based on the identification and the facial photos of the floating population. The systems and methods may identify abnormal activities using the registration and fingerprint records, and report the abnormal activities to the police and/or the administrator to ensure security of the rental houses. In this way, the systems and methods of the present disclosure may help the police and the administrators to management the floating population more efficiency, and to help the floating population to register more conveniently.

FIG. 1 is a schematic diagram of an exemplary system for managing a floating population according to some embodiments of the present disclosure. For example, the system 100 for managing a floating population (also referred to as the system 100) may be an online platform for providing register and profile creation services of the floating population, fingerprint input/freeze/deletion services of the floating population, and/or abnormal behavior alert services of the floating population to manage the floating population in specific places such as rental houses (e.g., rental apartments, hotels, or inns). The system 100 may include a server 110, a network 120, a terminal 130, a storage 140, a fingerprint lock 150 and a police platform 160.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the terminal 130, the storage 140, the fingerprint lock 150 and/or the police platform 160 via the network 120. As another example, the server 110 may connect the terminal 130, the storage 140, the fingerprint lock 150 and/or the police platform 160 to access stored information and/or data. In some embodiments, the server 110 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to a floating population (also referred as a user). For example, the processing engine 112 may create a profile (e.g., an ID tag) for the user based on a register of the user and data associated with the user stored in the police platform 160. As another example, the processing engine 112 may determine whether to open a fingerprint lock based on a fingerprint of the user and a permission of an administrator associated with the fingerprint lock. As still another example, the processing engine 112 may determine whether there is an abnormality based on a plurality of fingerprint records of the user. In some embodiments, the processing engine 112 may include one or more processing engines (e.g., single-core processing engine(s) or multi-core processor(s)). Merely by way of example, the processing engine 112 may be one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the system 100 (e.g., the server 110, the terminal 130, the storage 140, the fingerprint lock 150 and/or the police platform 160) may transmit information and/or data to other component(s) in the system 100 via the network 120. For example, the server 110 may obtain a register of a user from a user terminal via the network 120. As another example, the server 110 may receive a fingerprint input instruction from an administrator terminal via the network 120. As still another example, the server 110 may send the fingerprint input instruction to a fingerprint lock via the network 120. As further another example, the server 110 may access a database stored in the police platform 160 via the network 120. In some embodiments, the network 120 may be any type of wired or wireless network, or combination thereof. Merely by way of example, the network 120 may be a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, a long range radio (LoRa) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the system 100 may be connected to the network 120 to exchange data and/or information between them. In some embodiments, one or more components of the system 100 (e.g., the server 110, the terminal 130, the storage 140, the fingerprint lock 150 and/or the police platform 160) may transmit information and/or data to other component(s) in the system 100 via different types of the network 120. For example, the server 110 may transmit information and/or data to the terminal 130, the storage 140, and/or the police platform 160 via any type of the network 120 illustrated above. As another example, the server 110 and/or the storage 140 may transmit information and/or data to the fingerprint lock 150 via a particular type of the network 120 (i.e., the LoRa network). The base stations 120-1, 120-2, . . . , may be the LoRa base station.

The terminal 130 may be any electronic device used by a user or an administrator (e.g., a landlord, a community manager, a household administered, a civil police) associated with the fingerprint lock 150. In some embodiments, the terminal 130 may be a mobile device 130-1, a tablet computer 130-2, a laptop computer 130-3, a desktop computer 130-4, or the like, or any combination thereof. In some embodiments, the mobile device 130-1 may be a wearable device, a smart mobile device, a virtual reality device, an augmented reality device, or the like, or any combination thereof. In some embodiments, the wearable device may be a smart bracelet, a smart footgear, a smart glass, a smart helmet, a smart watch, a smart clothing, a smart backpack, a smart accessory, or the like, or any combination thereof. In some embodiments, the smart mobile device may be a smartphone, a personal digital assistance (PDA), a gaming device, a navigation device, a point of sale (POS) device, or the like, or any combination thereof. In some embodiments, the virtual reality device and/or the augmented reality device may be a virtual reality helmet, a virtual reality glass, a virtual reality patch, an augmented reality helmet, an augmented reality glass, an augmented reality patch, or the like, or any combination thereof. For example, the virtual reality device and/or the augmented reality device may be a Google Glass™, a RiftCon™, a Fragments™, a Gear VR™, etc. In some embodiments, the desktop computer 130-4 may be an onboard computer, an onboard television, etc.

In some embodiments, the terminal 130 may be a device with positioning technology for locating the position of the passenger and/or the terminal 130. The positioning technology used in the present disclosure may be a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

In some embodiments, the terminal 130 may further include at least one network port. The at least one network port may be configured to send information to and/or receive information from one or more components in the system 100 (e.g., the server 110, the storage 140) via the network 120. In some embodiments, the terminal 130 may be implemented on a computing device 200 having one or more components illustrated in FIG. 2, or a mobile device 300 having one or more components illustrated in FIG. 3 in the present disclosure.

In some embodiments, the user and the administrator may have different authorities associated with the fingerprint lock 150 via different applications of the terminal 130. The terminal 130 associated with the user may also be referred to as the user terminal, and the terminal 130 associated with the administrator may also be referred to as the administrator terminal. For example, the user may register or receive a random key of the fingerprint lock 150 via the user terminal, and may not have an authority to modify a setting (e.g., adding or deleting fingerprints) of the fingerprint lock 150. As another example, the administrator may send a fingerprint input instruction, a permission for opening the fingerprint lock, a fingerprint freezing instruction or a finger deletion instruction via the administrator terminal, and may not access the fingerprint lock 150 using a fingerprint of the administrator. As still another example, the administrator may receive an alert associated with the user via the administrator terminal.

The storage 140 may store data and/or instructions. For example, the storage 140 may store data obtained from the terminal 130 (e.g., a register of the user, a permission of the administrator). As another example, the storage 140 may store data obtained from the fingerprint lock 150 (e.g., a plurality of fingerprint records of the user). As still example, the storage 140 may store data determined from the police platform 160 (e.g., an ID tag of the user). As further another example, the storage 140 may store data and/or instructions that the server 110 may execute or use to perform exemplary methods described in the present disclosure. In some embodiments, the storage 140 may be a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 140 may be implemented on a cloud platform. Merely by way of example, the cloud platform may be a private cloud, a public cloud, a hybrid cloud, a community cloud, a distributed cloud, an inter-cloud, a multi-cloud, or the like, or any combination thereof.

In some embodiments, the storage 140 may include at least one network port to communicate with other devices in the system 100. For example, the storage 140 may be connected to the network 120 to communicate with one or more components of the system 100 (e.g., the server 110, the terminal 130) via the at least one network port. One or more components in the system 100 may access the data or instructions stored in the storage 140 via the network 120. In some embodiments, the storage 140 may be directly connected to or communicate with one or more components in the system 100 (e.g., the server 110, the terminal 130, the fingerprint lock 150, the police platform 160). In some embodiments, the storage 140 may be part of the server 110.

The fingerprint lock 150 may be a smart lock that can be opened with one or more fingerprints and can communicate with a LoRa base station. In some embodiments, the user may enter one or more fingerprints of the user into the fingerprint lock 150 and open the fingerprint lock 150 by the one or more fingerprints of the user with permissions of the administrator associated with the fingerprint lock 150. In some embodiments, the user may open the fingerprint lock 150 by a temporary key that requested from the administrator. The temporary key may be timely limited and become invalidity after a predetermined time period passes. In some embodiments, the fingerprint lock 150 may transmit information and/or data from/to one or more components of the system 100 (e.g., the server 110, the storage 140) via the LoRa base station (or the Lora network). For example, the fingerprint lock 150 may receive a fingerprint input instruction from the server 110 via the Lora network. As another example, the fingerprint lock 150 may send one or more fingerprints of the user to the server 110 via the Lora network. As still another example, the fingerprint lock 150 may send a plurality of fingerprint records of the user to the storage 140 via the Lora network.

The police platform 160 may be a service platform storing a large amount of security data, and an application in communication with the system of this invention may be installed therein. For example, the police platform 160 may include a database that stores information and/or data associated with wanted persons. The wanted persons may refer to a group of persons with criminal records (e.g., theft, robbery, rape, murder, etc.). The information and/or data associated with wanted persons may include their facial photos, fingerprint information, profile information (e.g., a gender, an age, contact information, a telephone number, an education level, an address, an occupation, a marriage state, a criminal record, a credit record), etc. In some embodiments, the information and/or data associated with the wanted persons may be used for determining whether the user is a suspect. As another example, the police platform 160 may include a database that stores information and/or data associated with residents and/or floating population within a particular area (e.g., a country, a city, a district, a community, etc.). In some embodiments, the police platform 160 may communicate with a plurality of police terminals. The police terminals may be terminals holding by polices and be similar to the terminal(s) 130. For example, when the police platform 160 receives an alert showing an abnormality associated with the user from the server 110, the police platform 160 may send a notification to at least one of the plurality of police terminals for arranging at least one police associated with the at least one police terminal to perform door-to-door verification.

In some embodiments, one or more components of the system 100 (e.g., the server 110, the terminal 130, the storage 140, the fingerprint lock 150, and the police platform 160) may communicate with each other in form of electronic and/or electromagnetic signals, through wired and/or wireless communication. In some embodiments, the system 100 may further include at least one data exchange port. The at least one exchange port may be configured to receive information and/or send information relating to the floating population (e.g., in form of electronic signals and/or electromagnetic signals) between any electronic devices in the system 100. In some embodiments, the at least one data exchange port may be one or more of an antenna, a network interface, a network port, or the like, or any combination thereof. For example, the at least one data exchange port may be a network port connected to the server 110 to send information thereto and/or receive information transmitted therefrom. As another example, the at least one data exchange port may include one or more terminal interfaces configured to communicate with the terminal(s) 130. As still another example, the at least one data exchange port may include one or more network interfaces connected with the LoRa base station that can communicate with the fingerprint lock(s) 150. As further another example, the at least one data exchange port may include one or more platform interfaces configured to communicate with the police platform 160. In some embodiments, the at least one data exchange port or the one or more interfaces may be part of the server 110 (e.g., an interface module 420 of the processing engine 112 shown in FIG. 4).

Figure 2:
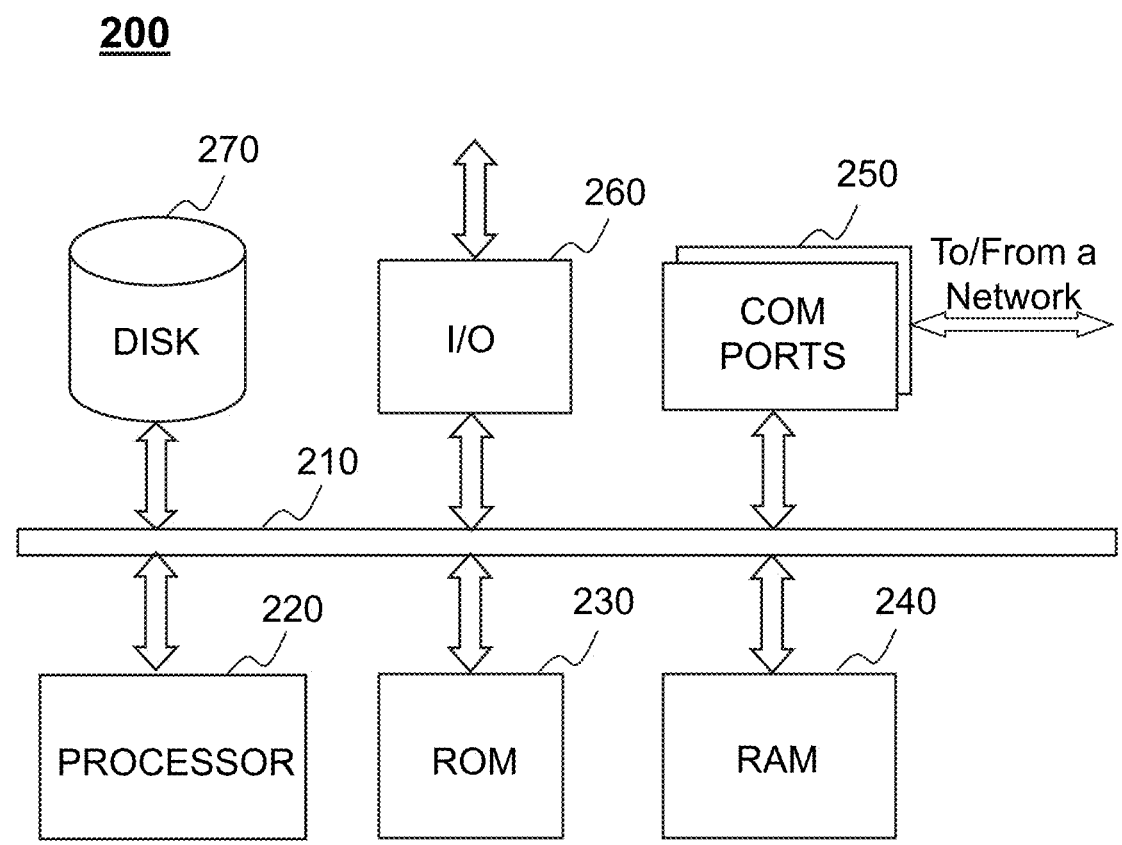
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, and/or the terminal 130 may be implemented according to some embodiments of the present disclosure. For example, the processing engine 112 may be implemented on the computing device 200 and configured to perform functions of the processing engine 112 disclosed in this disclosure.

The computing device 200 may be used to implement a system 100 for the present disclosure. The computing device 200 may be used to implement any component of system 100 that perform one or more functions disclosed in the present disclosure. For example, the processing engine 112 may be implemented on the computing device 200, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The COM port 250 may be any network port or data exchange port to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. The processing circuits may also generate electronic signals including the conclusion or the result and a triggering code. In some embodiments, the trigger code may be in a format recognizable by an operation system (or an application installed therein) of an electronic device (e.g., the terminal 130) in the system 100. For example, the trigger code may be an instruction, a code, a mark, a symbol, or the like, or any combination thereof, that can activate certain functions and/or operations of a mobile phone or let the mobile phone execute a predetermined program(s). In some embodiments, the trigger code may be configured to rend the operation system (or the application) of the electronic device to generate a presentation of the conclusion or the result (e.g., a prediction result) on an interface of the electronic device. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The exemplary computing device may also include operation systems stored in the ROM 230, RAM 240, and/or other type of non-transitory storage medium to be executed by the processor 220. The program instructions may be compatible with the operation systems for providing the online to offline service. The computing device 200 also includes an I/O component 260, supporting input/output between the computer and other components. The computing device 200 may also receive programming and data via network communications.

Merely for illustration, only one processor is illustrated in FIG. 2. Multiple processors are also contemplated; thus, operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
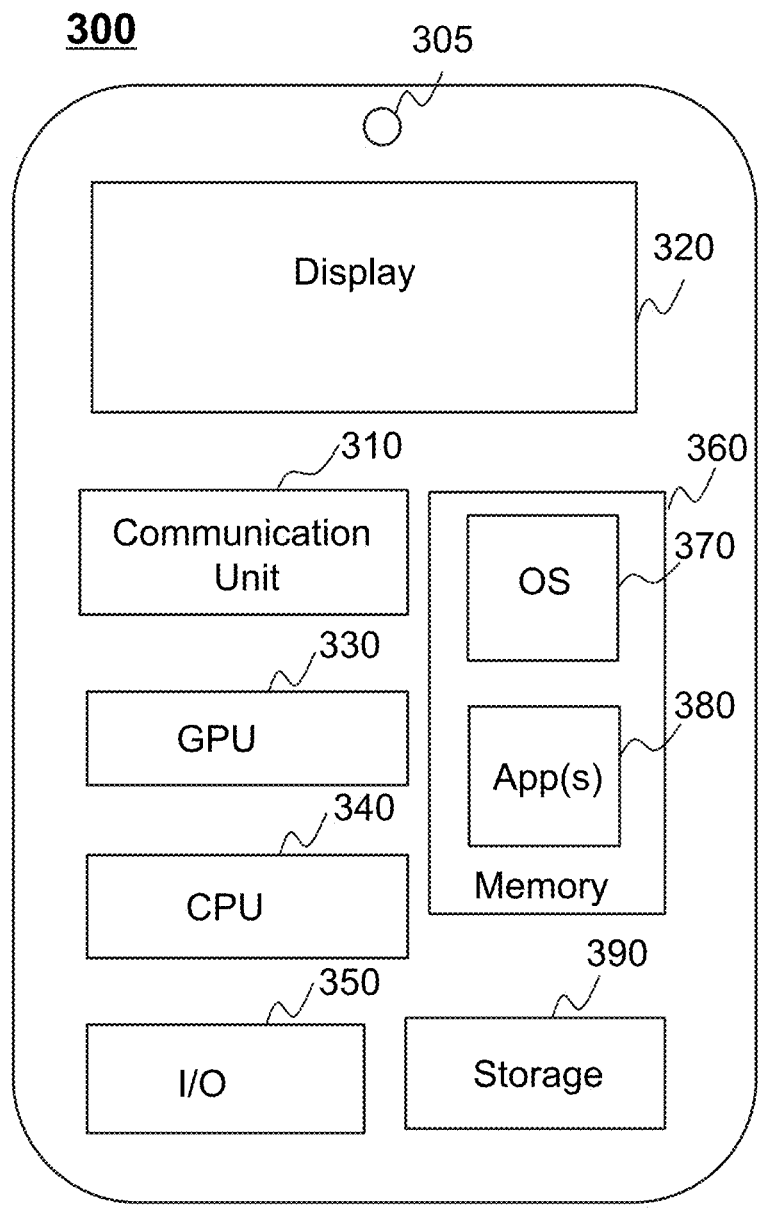
FIG. 3 is a schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the terminal 130 may be implemented according to some embodiments of the present disclosure.

As illustrated in FIG. 3, the mobile device 300 may include a camera 305, a communication platform 310, a display 320, a graphic processing unit (GPU) 330, a central processing unit (CPU) 340, an I/O 350, a memory 360, and a storage 390. The camera 305 may be configured to perform functions for taking identification photos or facial photos of the floating population. The CPU may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to managing the floating population. User interactions with the information stream may be achieved via the I/O devices 350 and provided to the processing engine 112 and/or other components of the system 100 via the network 120.

To implement various modules, units, and their functionalities described in the present disclosure, computer hardware platforms may be used as the hardware platform(s) for one or more of the elements described herein (e.g., the system 100, and/or other components of the system 100 described with respect to FIGS. 1-10). The hardware elements, operating systems and programming languages of such computers are conventional in nature, and it is presumed that those skilled in the art are adequately familiar therewith to adapt those technologies to managing a floating population as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

One of ordinary skill in the art would understand that when an element of the system 100 performs, the element may perform through electrical signals and/or electromagnetic signals. For example, when a server 110 processes a task, such as creating a profile for a user based on the register, the server 110 may operate logic circuits in its processor to process such task. When the server 110 completes creating a profile for a user based on the register, the processor of the server 110 may generate electrical signals encoding the profile of the user. The processor of the server 110 may then send the electrical signals to at least one data exchange port of a target system associated with the server 110. The server 110 communicates with the target system via a wired network, the at least one data exchange port may be physically connected to a cable, which may further transmit the electrical signals to an input port (e.g., an inforamtion exchange port) of the terminal 130. If the server 110 communicates with the target system via a wireless network, the at least one data exchange port of the target system may be one or more antennas, which may convert the electrical signals to electromagnetic signals. Within an electronic device, such as the terminal 130, and/or the server 110, when a processor thereof processes an instruction, sends out an instruction, and/or performs an action, the instruction and/or action is conducted via electrical signals. For example, when the processor retrieves or saves data from a storage medium (e.g., the storage 140), it may send out electrical signals to a read/write device of the storage medium, which may read or write structured data in the storage medium. The structured data may be transmitted to the processor in the form of electrical signals via a bus of the electronic device. Here, an electrical signal may be one electrical signal, a series of electrical signals, and/or a plurality of discrete electrical signals.

Figure 4:
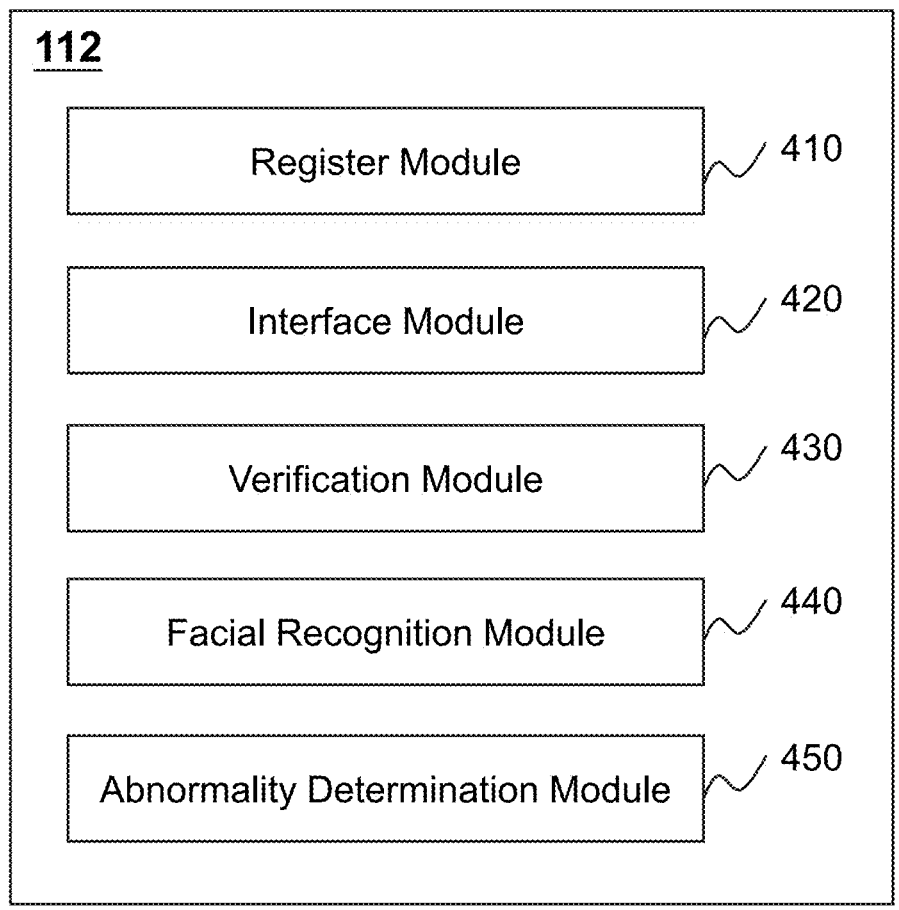
FIG. 4 is a block diagram illustrating an exemplary processing engine according to some embodiments of the present disclosure.

FIG. 4 is a block diagram illustrating an exemplary processing engine according to some embodiments of the present disclosure. As illustrated in FIG. 4, the processing engine 112 may include a register module 410, an interface module 420, a verification module 430, a facial recognition module 440, and an abnormality determination module 450.

The register module 410 may be configured to receive a register of a user from a user terminal. The register of the user may be a record of a name of the user together with a plurality of information of the user. For example, the register may include personal information of the user, an identification photo of the user, a facial photo of the user, or the like, or any combination thereof. In some embodiments, the user may input or upload personal information or data relating to the register of the user via an application associated with a fingerprint lock in the user terminal or add a public account associated with the fingerprint lock to a public platform (e.g., WeChat™) integrated in the user terminal to complete the register. The application or the public platform may send the register of user to the register module via at least one terminal interface.

The interface module 420 may be configured to receive information and/or data from one or more components of the system 100 (e.g., the terminal 130, the fingerprint lock 150, or the police platform 160) and send information and/or data to one or more components of the system 100 (e.g., the terminal 130, the fingerprint lock 150, or the police platform 160). For example, the interface module 420 may receive a fingerprint input instruction from an administrator terminal. The fingerprint input instruction may include information to allow the user to enter at least one fingerprint of the user to into the fingerprint lock 150. As another example, the interface module 420 may send the fingerprint input instruction to the fingerprint lock 150. After the fingerprint lock 150 receives the fingerprint input instruction, the user may be allowed to enter at least one fingerprint of the user into the fingerprint lock 150. As still another example, the interface module 420 may obtain the at least one fingerprint of the user from the fingerprint lock 150 and send a notification the administrator terminal to notify the administrator that the at least one fingerprint has been entered in the fingerprint lock 150. As further another example, the interface module 420 may obtain a random key (that is generated by a request of the administrator) from the user terminal for opening the fingerprint lock 150.

The verification module 430 may be configured to determine whether an identification photo is consistent with the user. In some embodiments, the verification module 430 may determine whether the identification photo is consistent with the user utilizing a facial recognition technology. For example, the verification module 430 may obtain the identification photo of the user and a facial photo of the user from the user terminal. The verification module 430 may identify a first plurality of facial features from the identification photo and a second plurality of facial features from the facial photo based on the facial recognition technology respectively. The verification module 430 may determine whether the identification photo is consistent with the user by comparing the first plurality of facial features with the second plurality of facial features. More descriptions of determining whether the identification photo is consistent with the user may be found elsewhere in the present disclosure (e.g., FIG. 6 and the descriptions thereof).

The facial recognition module 440 may be configured to determine an ID tag of the user. For example, the facial recognition module 440 may access a database stored in the police platform 160. The database may include information and/or data associated with wanted persons, information of resident permits of floating population, etc. The wanted persons may refer to a group of persons with criminal records (e.g., a theft, a robbery, a rape, a murder). The information and/or data associated with wanted persons may include their facial photos, fingerprint information, ID numbers, profile information (e.g., a gender, an age, contact information, a telephone number, an education level, an address, an occupation, a marriage state, a criminal record, a credit record), etc. The facial recognition module 440 may determine whether the user is a suspect based on a facial photo of the user obtained from the user terminal and facial photos of wanted persons in the database utilizing a facial recognition technology. The facial recognition module 440 may determine the ID tag of the user based on the determining whether the user is a suspect. More descriptions of determining the ID tag of the user may be found elsewhere in the present disclosure (e.g., FIG. 7 and the descriptions thereof).

Figure 8:
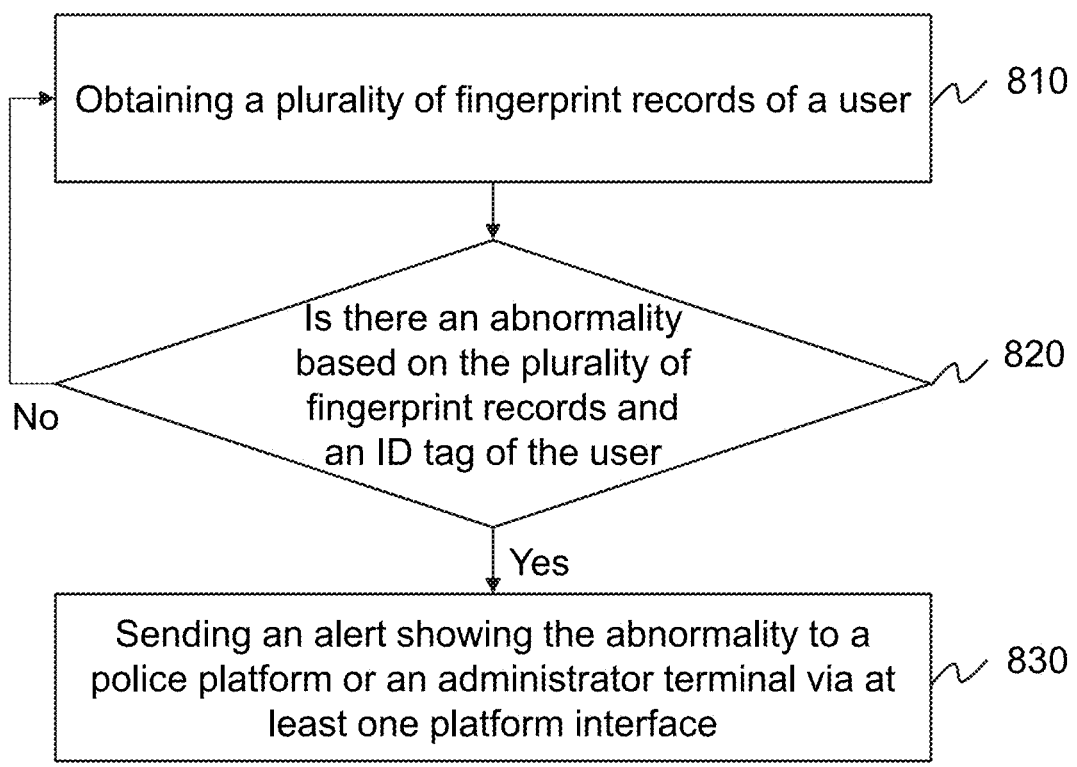
FIG. 8 is a flowchart illustrating an exemplary process for sending an alert showing an abnormality associated with a user according to some embodiments of the present disclosure.

The abnormality determination module 450 may be configured to determine whether there is an abnormality associated with the user. In some embodiments, the abnormality determination module 450 may obtain a plurality of fingerprints records of the user. The abnormality determination module 450 may determine whether there is an abnormality based on the plurality of fingerprint records and an ID tag of the user. In response to a determination that there is an abnormality, the abnormality determination module 450 may send an alert showing the abnormality to the police platform 160. In some embodiments, the abnormality determination module 450 may determine whether the user has been absent for a predetermined time period based on the plurality of fingerprints of the user. In response to a determination that the user has been absent for the predetermined time period, the abnormality determination module 450 may send an alert showing the user has left to the administrator terminal. More descriptions of sending the alert showing the abnormality associated with the user may be found elsewhere in the present disclosure (FIG. 8 and the descriptions thereof).

The modules in the processing engine 112 may be connected to or communicate with each other via a wired connection or a wireless connection. The wired connection may be a metal cable, an optical cable, a hybrid cable, or the like, or any combination thereof. The wireless connection may be a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the verification module 430 and the facial recognition module 440 may be integrated into one single module. As another example, the abnormality detrminarion 450 may be divided into units for determining the abnormality and sending the alert respectively. As till example, the processing engine 112 may include a storage module (not shown) used to store data and/or information relating to the user (e.g., profile of the user).

Figure 5:
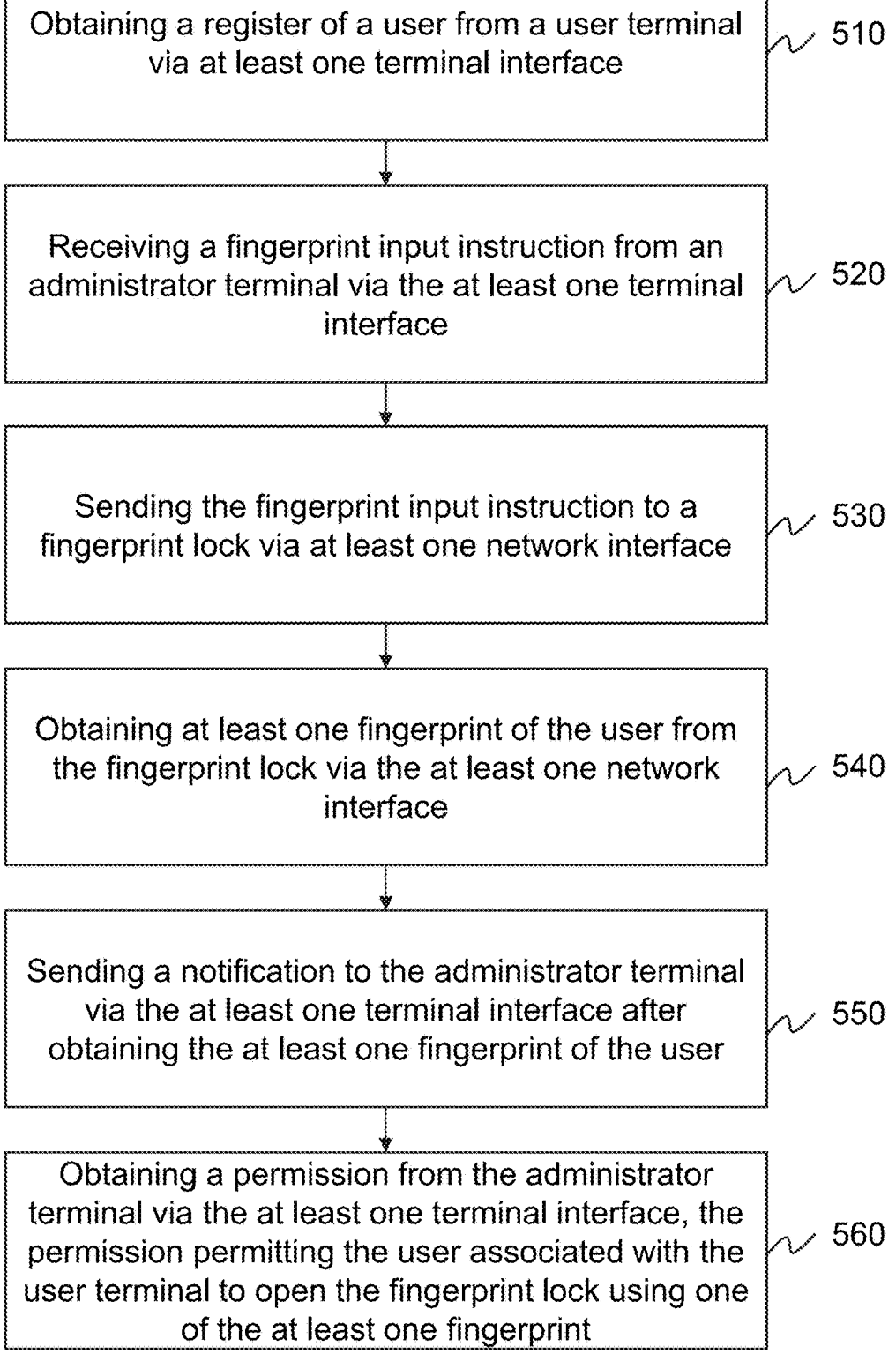
FIG. 5 is a flowchart illustrating an exemplary process for obtaining a permission from an administrator for permitting a user to open a finger print lock according to some embodiments of the present disclosure.

FIG. 5 is a flowchart illustrating an exemplary process for obtaining a permission from an administrator for permitting a user to open a finger print lock according to some embodiments of the present disclosure. The process 500 may be executed by the system 100. For example, the process 500 may be implemented as a set of instructions (e.g., an application) stored in the storage ROM 230 or RAM 240. The processor 220 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the processor 220, the register module 410) may obtain a register of a user from a user terminal via at least one terminal interface.

In some embodiments, the user may be a floating population who rent or check in a rental house (e.g., a rental apartment, a hotel). For example, the user may be a tenant or a lodger of the rental house. In some embodiments, the register of the user may be a record of a name of the user together with a plurality of other information of the user. For example, the register may include personal information of the user, an identification photo of the user, a facial photo of the user, or the like, or any combination thereof. The personal information of the user may include a name, a gender, an age, an identification number, contact information, a telephone number, an education level, an address, an occupation, a marriage state, a criminal record, a credit record, or the like, or any combination thereof. The identification photo of the user may be a photo of valid documentation of the user. The photo of valid documentation of the user may include photos of front and back of an ID card of the user, a photo of a passport the user, a photo of a social security card of the user, a photo of a driving license of the user, or the like, or any combination thereof. In some embodiments, the user may input or upload the register of the user via the user terminal. For example, the user may install an application associated with a fingerprint lock in the user terminal or add a public account associated with the fingerprint lock to a public platform (e.g., WeChat™) integrated in the user terminal. The user may access or login the application or the public account based on information (e.g., a telephone number, an ID number, a name, etc.) of the user. The user may input or upload personal information or data relating to the register of the user through the application or the public account to complete the register. The application or the public account may send the register of the user to the processing engine 112 via the at least one terminal interface and the network 120.

In some embodiments, during obtaining the register of the user, the processing engine 112 (e.g., the processor 220, the verification module 430) may determine whether the identification photo is consistent with the user based on the identification photo and the facial photo of the user. A determination of whether the identification photo is consistent with the user may indicate whether the user that is registering (the user that is taking the facial photo) is the real holder of the ID card. In response to a determination that the identification photo is not consistent with the user, the processing engine 112 may send an inquiry to the user terminal for confirmation. More descriptions of determining whether the identification photo is consistent with the user may be found elsewhere in the present disclosure (e.g., FIG. 6 and the descriptions thereof).

In some embodiments, the processing engine 112 may create a profile of the user associated with the user terminal based on the register. The profile of the user may include information of the register of the user, an ID tag of the user, a current address of the user, one or more fingerprints of the user, one or more fingerprint records of the user, or the like, or any combination thereof. The ID tag of the user may indicate a status of the user. For example, the ID tag of the user may include a resident, a floating population, a suspect, a drug user, a sex offender, a dangerous person, a wanted criminal, an ex-convict, or the like, or any combination thereof. In some embodiments, the ID tag of the user may be determined based on data stored in the police platform 160. More descriptions of determining an ID tag of the user may be found elsewhere in the present disclosure (e.g., FIG. 7 and the descriptions thereof).

In some embodiments, the user may have an authority to enter one or more fingerprints into the fingerprint lock and open the fingerprint lock with the one or more fingerprints with a permission from the administrator only after the user completing the register of the user.

In 520, the processing engine 112 (e.g., the processor 220, the interface module 420) may receive a fingerprint input instruction from an administrator terminal via the at least one terminal interface.

In some embodiments, the fingerprint input instruction may include information allowing a particular person (e.g., the user registered in 510) to enter at least one fingerprint of the user into a fingerprint lock. The at least one fingerprint entered may be a key to open the fingerprint lock. In some embodiments, the administrator may be a person or an organization that manages the rental houses and/or the floating population. For example, the administrator may include a landlord, a community manager, a household administered, a civil police, or the like, or any combination thereof. In some embodiments, the administrator may install an application associated with a fingerprint lock in the administrator terminal or add a public account associated with the fingerprint lock to a public platform (e.g., WeChat™) integrated in the administrator terminal. The administrator may access or login the application or the public account based on information (e.g., a telephone number, an ID number, a management account, etc.) of the administrator. The administrator may input the fingerprint input instruction through the application or the public account. The application or the public account may send the fingerprint input instruction to the processing engine 112 via the at least one terminal interface and the network 120.

In some embodiments, the application or the public account associated with the administrator terminal may be the same as or different from the application or the public account associated with the user terminal. For example, the application associated with the administrator terminal may be an administrator application that can only be logged in by an identity of an administrator. The application associated with the user terminal may be a user application that can only be logged in by an identity of a user. As another example, the public account associated with the administrator terminal may be the same as the public account associated with the user terminal. The administrator may login the public account as an identity of an administrator of the fingerprint lock. The user may login the public account as an identity of a user of the fingerprint lock. In some embodiments, different identities may have different authorities. For example, the administrator may send the fingerprint input instruction, a fingerprint freezing instruction, a finger deletion instruction, a temporary key request for opening the fingerprint lock via the administrator terminal, while the user may not perform the above operations.

In 530, the processing engine 112 (e.g., the processor 220, the interface module 420) may send the fingerprint input instruction to a fingerprint lock via at least one network interface. In some embodiments, the fingerprint lock may be a lock installed on a door of a rental house, a gate of a community of the rental house, a door of a hotel, or the like, or any combination thereof. Using the fingerprint lock, only people who inputs fingerprint(s) allowed by a master, a landlord, or an administrator may open the fingerprint lock and access the rental house or hotel.

In some embodiments, the processing engine 112 may send the fingerprint input instruction to the fingerprint lock via the network 120 (e.g., the LoRa network) via at least one network interface. After the fingerprint lock receives the fingerprint input instruction, the fingerprint lock may initiate a collection of one or more fingerprints of the user. For example, the fingerprint lock may initiate the collection of one or more fingerprints of the user by a voice prompt guiding the user to enter one or more fingerprints. The user may enter at least one fingerprint of the user into the fingerprint lock under the guidance of the voice prompt. As another example, the fingerprint lock may first identify the user according to a facial photo of the user, and then initiate the collection of one or more fingerprints of the user if the facial photo of the user is consistent with the ID.

In 540, the processing engine 112 (e.g., the processor 220, the interface module 420) may obtain at least one fingerprint of the user from the fingerprint lock via the at least one network interface.

In some embodiments, after the fingerprint lock collects the at least one fingerprint of the user, the fingerprint lock may save the at least one fingerprint of the user. The processing engine 112 may obtain the at least one fingerprint of the user from the fingerprint lock via the LoRa network. In some embodiments, the fingerprint lock may send the at least one fingerprint of the user to the storage 140 via the LoRa network and the storage 140 may save the at least one fingerprint of the user. The processing engine 112 may retrieve the at least one fingerprint of the user from the storage 140 via the network 120.

In 550, the processing engine 112 (e.g., the processor 220, the interface module 420) may send a notification to the administrator terminal via the at least one terminal interface after obtaining the at least one fingerprint of the user.

In some embodiments, the notification may notify the administrator that the user has successfully entered the at least one fingerprint of the user. After the administrator terminal receives the notification, the administrator may determine whether to permit the user to open the fingerprint lock using the at least one fingerprint of the user. In some embodiments, the administrator may determine a period of validity for the user to open the fingerprint lock using the at least one fingerprint of the user. For example, if the user rents a house associated with the fingerprint lock for one year, the administrator may set the period of validity as one year from the current time. The administrator may send a permission with the period of validity to the processing engine 112 via the network 120.

In 560, the processing engine 112 (e.g., the processor 220, the interface module 420) may obtain a permission from the administrator terminal via the at least one terminal interface. The permission may permit the user associated with the user terminal to open the fingerprint lock using one of the at least one fingerprint.

In some embodiments, the permission may include the period of validity determined by the administrator. When the period of validity is expired, the user may not open the fingerprint lock using one of the at least one fingerprint.

In some embodiments, after the permission from the administrator terminal, the user may use one of the at least one fingerprint to open the fingerprint lock. The fingerprint lock may send fingerprint records that the user uses the at least one fingerprint to open the fingerprint lock to the processing engine 112 or the storage 140. In some embodiments, the processing engine 112 may analyze the fingerprint records to determine whether there is an abnormality happens. In some embodiments, the processing engine 112 may send an alert associated with the user to the police platform 160 and/or the administrator terminal in response to a determination that there is an abnormality associated with the user. More descriptions of sending the alert may be found elsewhere in the present disclosure (e.g., FIG. 8 and the descriptions thereof).

In some embodiments, the administrator may determine to freeze or delete the at least one fingerprint of the user from the fingerprint lock at any time after the permission. For example, when the administrator terminal receives an alert associated with the user from the processing engine 112, the administrator may send a fingerprint freezing instruction or a finger deletion instruction to the fingerprint lock via the LoRa network. More descriptions of fingerprint freezing or deleting from the fingerprint lock may be found elsewhere in the present disclosure (e.g., FIG. 9 and the descriptions thereof).

In some embodiments, the user may open the fingerprint lock by a temporary key. The temporary key may be a key that is valid for a single use and time limited. The temporary key may be generated based on a temporary key request from the administrator terminal. More descriptions of obtaining the temporary key may be found elsewhere in the present disclosure (e.g., FIG. 10 and the descriptions thereof).

Figure 6:
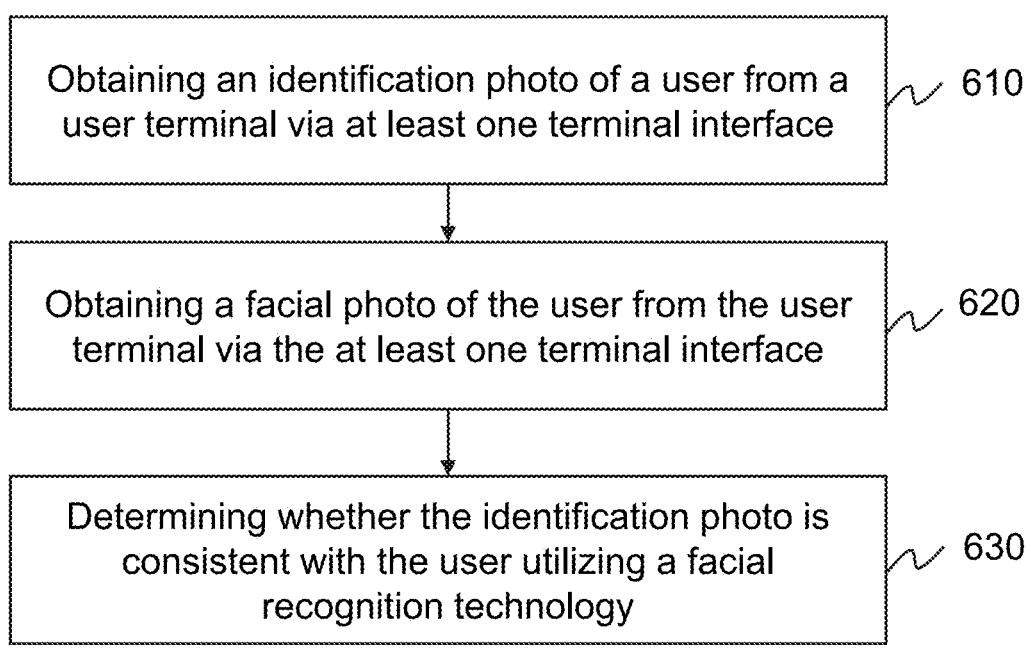
FIG. 6 is a flowchart illustrating an exemplary process for determining whether an identification photo is consistent with a user according to some embodiments of the present disclosure.
Figure 7:
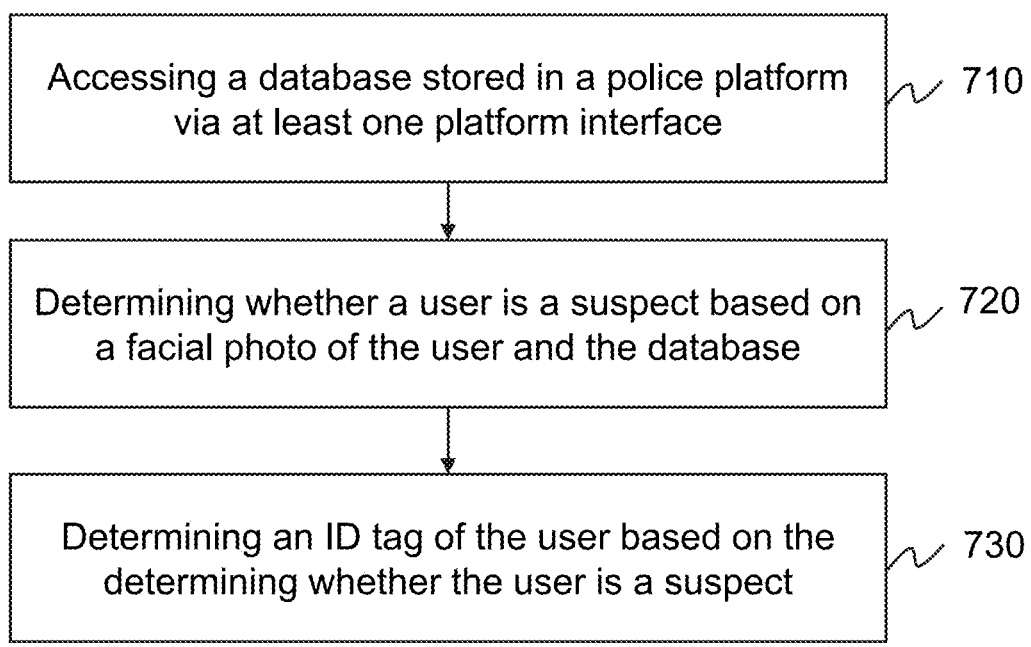
FIG. 7 is a flowchart illustrating an exemplary process for determining an ID tag of a user according to some embodiments of the present disclosure.

It should be noted that the above description is merely provided for the purposes of illustration, and not intended to limit the scope of the present disclosure. For persons having ordinary skills in the art, multiple variations and modifications may be made under the teachings of the present disclosure. For example, operation 510 may be divided into two steps for obtaining the register of the user and determining whether the identification photo is consistent with the user (as illustrated in FIG. 6), respectively. As another example, after operation 510, the method or process may also include an operation for create a profile for the user associated with the user terminal based on the register and the database stored in the police platform 160 (as illustrated in FIG. 7). However, those variations and modifications do not depart from the scope of the present disclosure.

FIG. 6 is a flowchart illustrating an exemplary process for determining whether an identification photo is consistent with a user according to some embodiments of the present disclosure. The process 600 may be executed by the system 100. For example, the process 600 may be implemented as a set of instructions (e.g., an application) stored in the storage ROM 230 or RAM 240. The processor 220 may execute the set of instructions, and when executing the instructions, it may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process as illustrated in FIG. 6 and described below is not intended to be limiting.

In 610, the processing engine 112 (e.g., the processor 220, the verification module 430) may obtain an identification photo of the user from a user terminal via at least one terminal interface.

In some embodiments, the identification photo of the user may indicate an identification of the user. For example, the identification photo may include an ID card photo, a passport photo, a social security card photo, a driving license photo, or the like, or any combination thereof. In some embodiments, the identification photo may include at least a half length bareheaded full faced photo of the user, a valid certificate number of the user, an expiry date, an issuing authority, or the like, or any combination thereof. Taking that the identification photo of the user is a photo of an ID card of the user as an example, the user may take the photos of the front and back of the ID card, respectively by a camera (e.g., the camera 305) installed in the user terminal and send the identification photo to the processing engine 112 or the storage 140 via the user terminal via the network 120. In some embodiments, the identification photo may be pre-stored in the user terminal and the user may directly send the identification photo to the processing engine 112 or the storage 140 via the user terminal.

In 620, the processing engine 112 (e.g., the processor 220, the verification module 430) may obtain a facial photo of the user from the user terminal via the at least one terminal interface.

In some embodiments, the facial photo of the user may be bareheaded and full faced including five sense organs (ears, eyes, lips, nose and tongue). The user may take the facial photo by the camera installed the user terminal in current time when the user sends the facial photo to the processing engine 112 via the user terminal. If the user tires to send the facial photo pre-stored in the user terminal, the processing engine 112 may not respond to the facial photo and/or prompt failure to send the photo.

In 630, the processing engine 112 (e.g., the processor 220, the verification module 430) may determine whether the identification photo is consistent with the user utilizing a facial recognition technology.

In some embodiments, the facial recognition technology may include feature-based recognition algorithms, appearance-based recognition algorithms, template-based recognition algorithms, recognition algorithms using neural network, or the like, or any combination thereof. Taking a feature-based recognition algorithm as an example, the processing engine 112 may identify a first plurality of features (e.g., shapes or sizes of eyes, nose and lips, distance between eyes) of the user in the identification photo. The processing engine 112 may identify a second plurality of features of the user corresponding to the first plurality of features of the user in the facial photo of the user. The processing engine 112 may determine a difference between the first plurality of features and the second plurality of features. The processing engine 112 may determine whether the difference is greater than a predetermined difference. The predetermined difference may be determined by an operator (e.g., based on experiences) or a default setting of the system 100. In response to a determination that the difference is greater than a predetermined difference, the processing engine 112 may determine that the identification photo is not consistent with the user. In response to a determination that the difference is equal to or smaller than a predetermined difference, the processing engine 112 may determine that the identification photo is consistent with the user.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the user may send a photo showing the user's holding a valid documentation (e.g., an ID card) to the processing engine 112. The processing engine 112 may identify a facial image of the user and a facial image in the valid documentation from the photo showing the user's holding the ID card. The processing engine 112 may further determine whether the ID card is consistent with the user based on the facial image of the user and the facial image in the valid documentation utilizing a facial recognition technology. In some embodiments, one or more other optional operations (e.g., a storing operation) may be added elsewhere in the exemplary process 600.

FIG. 7 is a flowchart illustrating an exemplary process for determining an ID tag of a user according to some embodiments of the present disclosure. The process 700 may be executed by the system 100. For example, the process 700 may be implemented as a set of instructions (e.g., an application) stored in the storage ROM 230 or RAM 240. The processor 220 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the processor 220, the facial recognition module 440) may access a database stored in a police platform (e.g., the police platform 160) via at least one platform interface.

In some embodiments, the database may store information and/or data associated with the wanted persons, floating population, residents, or the like, or any combination thereof. The wanted persons may refer to a group of persons with criminal records (e.g., a theft, a robbery, a rape, a murder, a drug addict, etc.). The information and/or data associated with wanted persons may include their facial photos, fingerprint information, ID numbers, profile information (e.g., a gender, an age, contact information, a telephone number, an education level, an address, an occupation, a marriage state, a criminal record, a credit record), or the like, or any combination thereof.

In 720, the processing engine 112 (e.g., the processor 220, the facial recognition module 440) may determine whether the user is a suspect based on a facial photo of the user and the database.

In some embodiments, the suspect may be a special person who may cause harm to security. For example, the suspect may be a special person with criminal records (e.g., a theft, a robbery, a rape, a murder, a drug addict, etc.) or a special person under suspicion. In some embodiments, the processing engine 112 may obtain the facial photo of the user from the user terminal as described in 620 of FIG. 6. The processing engine 112 may compare the facial photo of the user with the facial photos of wanted persons stored in the database based on a facial recognition technology to determine whether the user is one of the wanted persons. The comparison process may be similar to the descriptions of 630 in FIG. 6. In response to a determination that the user is one of the wanted persons, the processing engine 112 may determine that the user is a suspect. In response to a determination that the user is not one of the wanted persons, the processing engine 112 may determine that the user is not a suspect.

In 730, the processing engine 112 (e.g., the processor 220, the facial recognition module 440) may determine an ID tag of the user based on the determining whether the user is a suspect.

In response to a determination that the user is a suspect, the processing engine 112 may retrieve criminal records of the user from the database. The processing engine 112 may determine the ID tag of the user by labeling the user with the criminal records of the user. For example, if the user has a theft record, the processing engine 112 may determine the ID tag of the user by labeling the user with the theft record. In response to a determination that the user is not a suspect, the processing engine may determine the ID tag of the user by label the user with blank. In some embodiments, the ID tag may be sent the administrator terminal via at least one terminal interface. The administrator may determine whether to permit the user to open the fingerprint lock based on the ID tag of the user.

In some embodiments, the processing engine 112 may obtain a plurality of ID tags of a plurality of candidate users. The processing engine 112 may determine whether there is a suspect among the plurality of candidate users based on the plurality of ID tags. In response to a determination that there is a suspect, the processing engine 112 may send a suspect alert to the police platform 160 via the at least one platform interface. The suspect alert may include a profile of the candidate user that determined as the suspect. The police platform 160 may notify at least one police to perform door-to door verification for the suspect based on the suspect alert. In some embodiments, the police platform 160 may also notify at least one police to patrol around the rental houses to ensure security.

In some embodiments, the processing engine 112 may determine a validity of a resident permit of the user based on the profile of the user and the database stored in the police platform. In response to a determination that the resident permit is due or overdue, the processing engine 112 may send a due-or-overdue alert to the administrator terminal via the at least one terminal interface. The administrator may determine whether to permit the user to open the fingerprint lock based on due-or-overdue alert by freezing or deleting fingerprints of the user from the fingerprint lock. In some embodiments, the administrator may also provide door-to-door service for the user to transact anew resident permit for the user.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the police platform 160 may obtain the facial photo of the user from the storage 140 or the processing engine 112. The police platform 160 may determine the ID tag of the user based on the facial photo of the user and the database stored in the police platform 160. The police platform 160 may send the determined ID tag of the user to the processing engine 112. In some embodiments, the processing engine 112 may identify an ID number from the identification photo obtained from the user terminal. The processing engine 112 may determine whether a user is a suspect based on the identified ID number and the database. In some embodiments, one or more other optional operations (e.g., a storing operation) may be added elsewhere in the exemplary process 700.

FIG. 8 is a flowchart illustrating an exemplary process for sending an alert showing an abnormality associated with a user according to some embodiments of the present disclosure. The process 800 may be executed by the system 100. For example, the process 800 may be implemented as a set of instructions (e.g., an application) stored in the storage ROM 230 or RAM 240. The processor 220 may execute the set of instructions, and when executing the instructions, it may be configured to perform the process 800. The operations of the illustrated process presented below are intended to be illustrative. In some embodiments, the process 800 may be accomplished with one or more additional operations not described and/or without one or more of the operations discussed. Additionally, the order in which the operations of the process as illustrated in FIG. 8 and described below is not intended to be limiting.

In 810, the processing engine 112 (e.g., the processor 220, the abnormality determination module 450) may obtain a plurality of fingerprint records of the user.

In some embodiments, each fingerprint record of the plurality of fingerprint records of the user may include a time point when the user opens the fingerprint lock. In some embodiments, the plurality of fingerprint records of the user may be within a preset historical time period (e.g., past one month, past one quarter, past half of a year, etc.). In some embodiments, processing engine 112 may obtain the plurality of fingerprints of the user from the storage 140 or from the fingerprint lock.

In 820, the processing engine 112 (e.g., the processor 220, the abnormality determination module 450) may determine whether there is an abnormality based on the plurality of fingerprint records and an ID tag of the user.

In some embodiments, the abnormality may indicate a potential risk of the security around the rental houses. For example, if a floating population has a suspicious behavior, the processing engine 112 may determine there is an abnormality. In some embodiments, if the ID tag of the user is associated with a theft record and the plurality of fingerprint records indicate that the user opens the fingerprint lock late at night (e.g., after 12:00 pm) at several consecutive days (e.g., 7 days, 10 days), the processing engine 112 may determine that there is an abnormality. In response to a determination that the there is an abnormality, process 800 may proceed to operation 830. In response to a determination that the there is no abnormality, process 800 may proceed to operation 810 for obtaining a plurality of updated fingerprint records of the user after a time length of the preset historical time period.

In some embodiments, the processing engine 112 may determine whether the user has been absent for a predetermined time period based on the plurality of fingerprint records of the user. Taking the predetermined time period of one month as an example, if the fingerprint records of the user within past one month from current time are blank, the processing engine 112 may determine that the user has been absent. In response to a determination that the user has been absent for the predetermined time period, the processing engine 112 may send an alert, showing the user has left, to the administrator terminal via at least one terminal interface. The administrator may perform door-to-door verification to confirm whether the user has left based on the alert. In some embodiments, the predetermined time period may be a default set stored in a storage (e.g., the storage 140) of the system 100, or determined by the system 100 or an operation of the system 100 according to different situations.

In 830, the processing engine 112 (e.g., the processor 220, the abnormality determination module 450) may send an alert showing the abnormality to the police platform via at least one platform interface.

In some embodiments, the alert showing the abnormality may include the abnormality and a profile of the user. For example, the police platform 160 may further notify at least one police to perform door-door verification to confirm the abnormality based on the alert. As another example, the police platform 160 may further notify at least one police to patrol around the rental houses to ensure security.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 800.

FIG. 9 is a flowchart illustrating an exemplary process for freezing or deleting at least one fingerprint of a user from a fingerprint lock according to some embodiments of the present disclosure. The process 900 may be executed by the system 100. For example, the process 900 may be implemented as a set of instructions (e.g., an application) stored in the storage ROM 230 or RAM 240. The processor 220 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

In 910, the processing engine 112 (e.g., the processor 220, the interface module 420) may receive a fingerprint freezing instruction or a finger deletion instruction for freezing or deleting at least one fingerprint of a user from an administrator terminal via at least one terminal interface.

In some embodiments, the fingerprint freezing instruction may request for freezing the at least one fingerprint of the user such that the user may not open the fingerprint lock using the at least one fingerprint. The at least one fingerprint may be still stored in the fingerprint lock. In some embodiments, the finger deletion instruction may request for deleting the at least one fingerprint of the user from the fingerprint lock such that the user may not open the fingerprint lock using the at least one fingerprint. The at least one fingerprint may be deleted from the fingerprint lock. The user may need to re-enter the at least one fingerprint if the user hopes to open the fingerprint lock.

In 920, the processing engine 112 (e.g., the processor 220, the interface module 420) may send the fingerprint freezing instruction or the deletion instruction to a fingerprint lock via at least one network interface.

In some embodiments, after the fingerprint lock receives the fingerprint freezing instruction or the deletion instruction, the fingerprint lock may perform the fingerprint freezing instruction or the deletion instruction for freezing or deleting the at least one fingerprint of the user. The user may not open the fingerprint lock using the at least one fingerprint.

In 930, the processing engine 112 (e.g., the processor 220, the interface module 420) may obtain a notification showing the fingerprint lock has frozen or deleted the at least one fingerprint of the user from the fingerprint lock via the at least one network interface.

In some embodiments, after the fingerprint lock performs the fingerprint freezing instruction or the deletion instruction, the fingerprint lock may generate the notification showing the fingerprint lock has frozen or deleted the at least one fingerprint of the user from the fingerprint lock, and send the notification to the processing engine 112. In some embodiments, the processing engine 112 may forward this notification to the administrator terminal via the at least one terminal interface.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the exemplary process 900.

Figure 10:
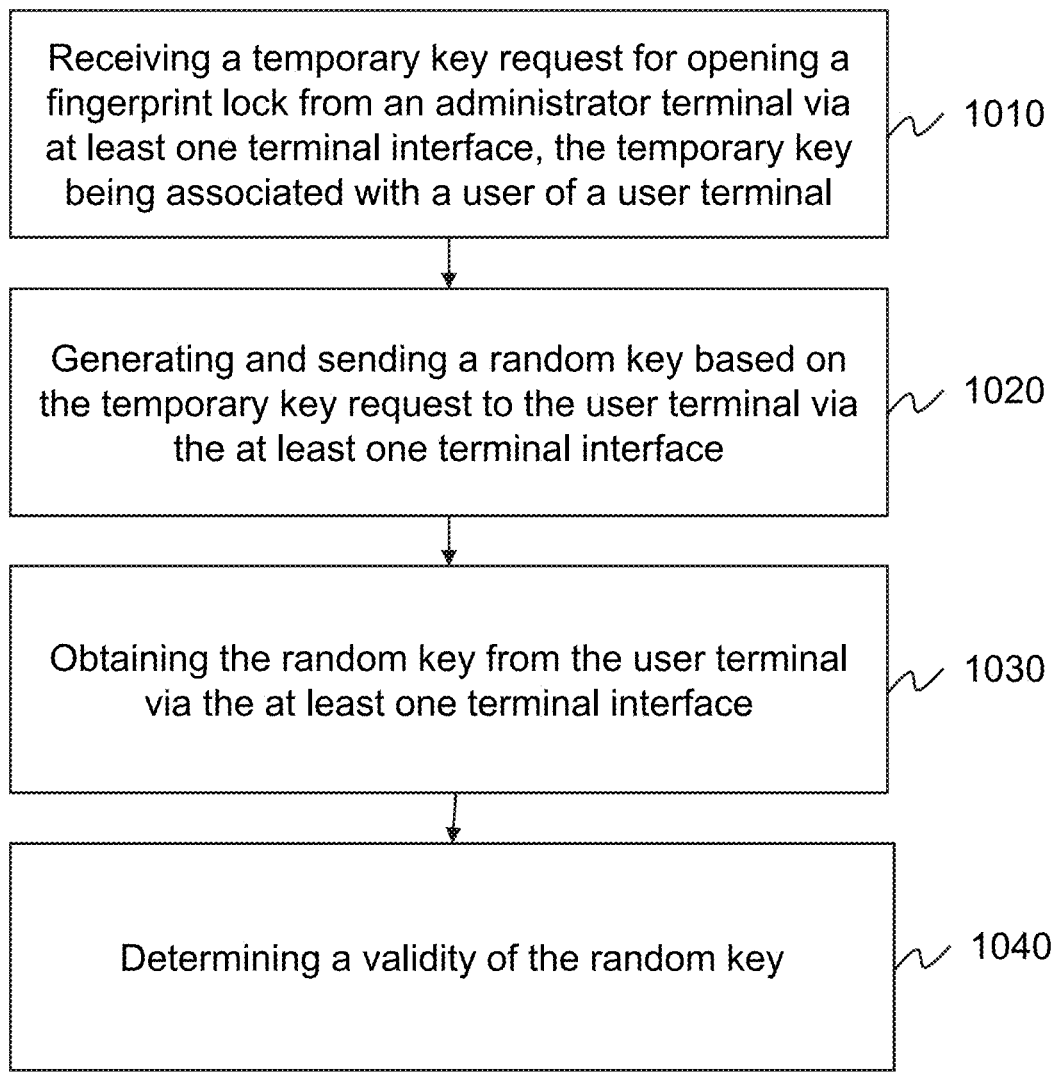
FIG. 10 is a flowchart illustrating an exemplary process for opening a fingerprint lock using a temporary key according to some embodiments of the present disclosure.

FIG. 10 is a flowchart illustrating an exemplary process for opening a fingerprint lock using a temporary key according to some embodiments of the present disclosure. The process 1000 may be executed by the system 100. For example, the process 1000 may be implemented as a set of instructions (e.g., an application) stored in the storage ROM 230 or RAM 240. The processor 220 may execute the set of instructions, and when executing the instructions, it may be configured to perform the process 1000. The operations of the illustrated process presented below are intended to be illustrative. In some embodiments, the process 1000 may be accomplished with one or more additional operations not described and/or without one or more of the operations discussed. Additionally, the order in which the operations of the process as illustrated in FIG. 10 and described below is not intended to be limiting.

In 1010, the processing engine 112 (e.g., the processor 220, the interface module 420) may receive a temporary key request for opening a fingerprint lock from an administrator terminal via at least one terminal interface. The temporary key may be associated with a user of a user terminal.

In some embodiments, in some cases, the administrator terminal may send the temporary key request for opening a fingerprint lock by the user. For example, the fingers of the user are injured, and the user cannot use his/her fingerprint to open the fingerprint lock, the administrator terminal may send the temporary key request for opening a fingerprint lock by the user.

In 1020, the processing engine 112 (e.g., the processor 220, the interface module 420) may generate and send a random key based on the temporary key request to the user terminal via the at least one terminal interface.

In some embodiments, the random key may be a random password or a verification code that may open the fingerprint lock. For example, after obtaining the temporary key request for opening the fingerprint lock from the administrator terminal, the processing engine 112 may send a random password or a verification code to the user terminal associated with the user. Entering the random password or the verification code into the fingerprint lock can open this same. In some embodiments, the random key may be valid for a single use and for a predetermined time length (e.g., 30 minutes). For example, if the user does not enter the random password or the verification code into the fingerprint lock within 30 minutes from obtaining the random password or the verification code, the random key may become invalid. In some embodiments, the predetermined time length may be a default set stored in a storage (e.g., the storage 140) of the system 100, or determined by the system 100 or an operation of the system 100 according to different situations.

In 1030, the processing engine 112 (e.g., the processor 220, the interface module 420) may obtain the random key from the user terminal via the at least one terminal interface.

In some embodiments, the user may enter the random key into the fingerprint lock, and the fingerprint lock may send the random key to the processing engine 112 to confirm whether to open the fingerprint lock for the user using the random key.

In 1040, the processing engine 112 (e.g., the processor 220, the interface module 420) may determine the validity of the random key.

In some embodiments, after the processing engine 112 obtains the random key from the user terminal, the processing engine may determine the validity of the random key. For example, the processing engine 112 may determine whether the random key has been used to open the fingerprint lock. As another example, the processing engine 112 may determine whether a time length from current time to the time point when the processing engine 112 sends the random key to the user terminal is greater than the predetermined time length. In response to a determination that the random key has been used or the time length is greater than the predetermined time length, the processing engine 112 may determine that the random key is invalid to open the fingerprint lock. In response to a determination that the random key has not been used and the time length is equal to or less than the predetermined time length, the processing engine 112 may determine that the random key is valid. The processing engine 112 may send an opening instruction to the fingerprint lock for opening the fingerprint lock.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the user may manually input the random key in the fingerprint lock. The fingerprint lock may send the random key to the processing engine 112. The fingerprint lock may determine whether to be opened based on the determination of the validity of the random key by the processing engine 112. In some embodiments, the fingerprint lock may further include a panel or a keypad for users to enter the random key. In some embodiments, one or more other optional operations (e.g., a storing operation) may be added elsewhere in the exemplary process 1000.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A system configured to manage a floating population, comprising:
   at least one storage medium including a set of instructions for managing the floating population;
   at least one terminal interface to communicate with at least one user terminal and at least one administrator terminal;
   at least one network interface to connect with a LoRa base station, wherein the LoRa base station communicates with a plurality of fingerprint locks; and
   at least one processor in communication with the at least one terminal interface, the at least one network interface, and the at least one storage medium, wherein when executing the set of instructions, the at least one processor is directed to:
   obtain a register of a user from a user terminal of the at least one user terminal via the at least one terminal interface;
   receive a fingerprint input instruction from an administrator terminal of the at least one administrator terminal via the at least one terminal interface;
   send the fingerprint input instruction to a fingerprint lock of the plurality of fingerprint locks via the at least one network interface;
   obtain at least one fingerprint of the user from the fingerprint lock via the at least one network interface;
   send, after obtaining the at least one fingerprint of the user, a notification to the administrator terminal via the at least one terminal interface; and
   obtain a permission from the administrator terminal via the at least one terminal interface, the permission permitting the user associated with the user terminal to open the fingerprint lock using one of the at least one fingerprint.

2. The system of claim 1, wherein to obtain the register, the at least one processor is further directed to:
   obtain an identification photo of the user from the user terminal via the at least one terminal interface;
   obtain a facial photo of the user from the user terminal via the at least one terminal interface; and
   determine whether the identification photo is consistent with the user utilizing a facial recognition technology.

3. The system of claim 2, wherein the at least one processor is further directed to:
   create a profile for the user associated with the user terminal based on the register.

4. The system of claim 3, further comprising at least one platform interface to communicate with a police platform, wherein to create the profile, the at least one processor is further directed to:
   access a database stored in the police platform via the at least one platform interface;
   determine whether the user is a suspect based on the facial photo and the database; and
   determine an ID tag of the user based on the determining whether the user is a suspect.

5. The system of claim 4, wherein the at least one processor is further directed to:
   obtain a plurality of fingerprint records of the user;
   determine whether there is an abnormality based on the plurality of fingerprint records and the ID tag of the user; and
   in response to a determination that there is an abnormality, send an alert showing the abnormality to the police platform via the at least one platform interface.

6. The system of claim 5, wherein the at least one processor is further directed to:
   determine whether the user has been absent for a predetermined time period based on the plurality of fingerprint records; and
   in response to a determination that the user has been absent for the predetermined time period, send an alert, showing the user has left, to the administrator terminal via the at least one terminal interface.

7. The system of claim 4, wherein the at least one processor is further directed to:
  obtain a plurality of ID tags of a plurality of candidate users;
  determine whether there is a suspect among the plurality of candidate users based on the plurality of ID tags; and
  send, in response to a determination that there is a suspect, a suspect alert to the police platform via the at least one platform interface.

8. The system of claim 4, wherein the at least one processor is further directed to:
  determine a validity of a resident permit of the user based on the profile of the user and the database stored in the police platform; and
  in response to a determination that the resident permit is due or overdue, send a due-or-overdue alert to the administrator terminal via the at least one terminal interface.

9. The system of claim 1, wherein the at least one processor is further directed to:
  receive a fingerprint freezing instruction or a finger deletion instruction for freezing or deleting the at least one fingerprint of the user from the administrator terminal via the at least one terminal interface;
  send the fingerprint freezing instruction or the deletion instruction to the fingerprint lock via the at least one network interface; and
  obtain a notification showing the fingerprint lock has frozen or deleted the at least one fingerprint of the user from the fingerprint lock via the at least one network interface.

10. The system of claim 1, wherein the at least one processor is further directed to:
  receive a temporary key request for opening the fingerprint lock from the administrator terminal via the at least one terminal interface, the temporary key being associated with the user of the user terminal;
  generate and send a random key based on the temporary key request to the user terminal via the at least one terminal interface;
  obtain the random key from the user terminal via the at least one terminal interface; and
  determine a validity of the random key.

11. A method for managing a floating population implemented on a system configured to manage the floating population, wherein the system comprises at least one terminal interface to communicate with at least one user terminal and at least one administrator terminal; at least one network interface to connect with a LoRa base station, the LoRa base station communicating with a plurality of fingerprint locks; and at least one processor in communication with the at least one terminal interface and the at least one network interface, and
  the method comprises:
    obtaining, by the at least one processor, a register of a user from a user terminal of the at least one user terminal via at least one terminal interface;
    receiving, by the at least one processor, a fingerprint input instruction from an administrator terminal of the at least one administrator terminal via the at least one terminal interface;
    sending, by the at least one processor, the fingerprint input instruction to a fingerprint lock of the plurality of fingerprint locks via at least one network interface;
    obtaining, by the at least one processor, at least one fingerprint of the user from the fingerprint lock via the at least one network interface;
    sending, by the at least one processor after obtaining the at least one fingerprint of the user, a notification to the administrator terminal via the at least one terminal interface; and
    obtaining, by the at least one processor, a permission from the administrator terminal via the at least one terminal interface, the permission permitting the user associated with the user terminal to open the fingerprint lock using one of the at least one fingerprint.

12. The method of claim 11, wherein the obtaining the register comprises:
  obtaining an identification photo of the user from the user terminal via the at least one terminal interface;
  obtaining a facial photo of the user from the user terminal via the at least one terminal interface; and
  determining whether the identification photo is consistent with the user utilizing a facial recognition technology.

13. The method of claim 12, further comprising:
  creating a profile for the user associated with the user terminal based on the register;
  wherein the creating the profile comprises:
  accessing a database stored in a police platform via at least one platform interface;
  determining whether the user is a suspect based on the facial photo and the database; and
  determining an ID tag of the user based on the determining whether the user is a suspect.

14. The method of claim 13, further comprising:
  obtaining a plurality of fingerprint records of the user;
  determining whether there is an abnormality based on the plurality of fingerprint records and the ID tag of the user; and
  in response to a determination that there is an abnormality, sending an alert showing the abnormality to the police platform via the at least one platform interface.

15. The method of claim 14, further comprising:
  determining whether the user has been absent for a predetermined time period based on the plurality of fingerprint records; and
  in response to a determination that the user has been absent for the predetermined time period, sending an alert, showing the user has left, to the administrator terminal via the at least one terminal interface.

16. The method of claim 13, further comprising:
  obtaining a plurality of ID tags of a plurality of candidate users;
  determining whether there is a suspect among the plurality of candidate users based on the plurality of ID tags; and
  sending, in response to a determination that there is a suspect, a suspect alert to the police platform via the at least one platform interface.

17. The method of claim 13, further comprising:
  determining a validity of a resident permit of the user based on the profile of the user and the database stored in the police platform; and
  in response to a determination that the resident permit is due or overdue, sending a due-or-overdue alert to the administrator terminal via the at least one terminal interface.

18. The method of claim 11, further comprising:
  receiving a fingerprint freezing instruction or a finger deletion instruction for freezing or deleting the at least one fingerprint of the user from the administrator terminal via the at least one terminal interface;
sending the fingerprint freezing instruction or the deletion instruction to the fingerprint lock via the at least one network interface; and
obtaining a notification showing the fingerprint lock has frozen or deleted the at least one fingerprint of the user from the fingerprint lock via the at least one network interface.

19. The method of claim 11, further comprising:
receiving a temporary key request for opening the fingerprint lock from the administrator terminal via the at least one terminal interface, the temporary key being associated with the user of the user terminal;
generating and sending a random key based on the temporary key request to the user terminal via the at least one terminal interface;
obtaining the random key from the user terminal via the at least one terminal interface; and
determining a validity of the random key.

20. A non-transitory readable medium, comprising at least one set of instructions for managing a floating population, wherein when executed by at least one processor of a system, the at least one set of instructions directs the at least one processor to perform a method, wherein the system comprises at least one terminal interface to communicate with at least one user terminal and at least one administrator terminal; at least one network interface to connect with a LoRa base station, the LoRa base station communicating with a plurality of fingerprint locks; and the at least one processor in communication with the at least one terminal interface and the at least one network interface, and the method comprises:
  obtaining, by the at least one processor, a register of a user from a user terminal of the at least one user terminal via at least one terminal interface;
  receiving, by the at least one processor, a fingerprint input instruction from an administrator terminal of the at least one administrator terminal via the at least one terminal interface;
  sending, by the at least one processor, the fingerprint input instruction to a fingerprint lock of the plurality of fingerprint locks via at least one network interface;
  obtaining, by the at least one processor, at least one fingerprint of the user from the fingerprint lock of the plurality of fingerprint locks via the at least one network interface;
  sending, by the at least one processor, after obtaining the at least one fingerprint of the user, a notification to the administrator terminal of the at least one administrator terminal via the at least one terminal interface; and
  obtaining, by the at least one processor, a permission from the administrator terminal of the at least one administrator terminal via the at least one terminal interface, the permission permitting the user associated with the user terminal of the at least one user terminal to open the fingerprint lock of the plurality of fingerprint locks using one of the at least one fingerprint.

* * * * *